United States Patent [19]

Nakazono et al.

[11] Patent Number: 4,903,656
[45] Date of Patent: Feb. 27, 1990

[54] GAS ENGINE

[75] Inventors: Touru Nakazono; Yoshihiro Natsume; Takashi Furuta, all of Osaka, Japan

[73] Assignee: Yanmar Deisel Engine Co., Ltd., Osaka, Japan

[21] Appl. No.: 291,895

[22] Filed: Dec. 29, 1988

[51] Int. Cl.[4] .............................................. F02M 31/00
[52] U.S. Cl. .................................... 123/259; 123/253; 123/266; 123/281
[58] Field of Search ................. 123/253, 259, 266, 281

[56] References Cited

U.S. PATENT DOCUMENTS

| 4,038,952 | 8/1977 | Nagano | 123/259 |
|---|---|---|---|
| 4,040,393 | 8/1977 | Decker et al. | 123/259 |
| 4,044,730 | 8/1977 | Masaaki et al. | 123/281 |
| 4,077,368 | 3/1978 | Abthoff et al. | 123/259 |
| 4,323,039 | 4/1982 | Isugekawa | 123/281 |
| 4,340,019 | 7/1982 | Barnert et al. | 123/253 |
| 4,424,780 | 1/1984 | Irucco | 123/255 |
| 4,646,695 | 3/1987 | Blackburn | 123/266 |
| 4,696,269 | 9/1987 | Blackburn | 123/266 |
| 4,766,861 | 8/1988 | Fiorsterwalder | 123/266 |

FOREIGN PATENT DOCUMENTS 55-14749  4/1980  Japan .
62-331    1/1987  Japan .

Primary Examiner—Raymond A. Nelli
Attorney, Agent, or Firm—Armstrong, Nikaido, Marmelstein, Kubovcik & Murray

[57] ABSTRACT

A gas engine of a pre-chamber type in which a pre-chamber is arranged in communication to a main combustion chamber, an intake passage is arranged to supply lean mixture to the main chamber, a gas pipe is provided to form rich mixture by fuel gas in the pre-chamber, and a spark plug adapted to ignite the rich mixture in the pre-chamber prior to the combustion of lean mixture in the main combustion chamber, is characterized in that an area of a section of the pre-chamber gradually decreases toward the main combustion chamber.

5 Claims, 14 Drawing Sheets

| | 600 | 900 | 1200 | 1500 | 1800 | 2000 | R (r.p.m) |
|---|---|---|---|---|---|---|---|
| 200 | 0.9 | 0.8 | 0.8 | 0.7 | 0.7 | 0.7 | |
| 400 | 1.0 | 0.9 | 0.9 | 0.8 | 0.8 | 0.8 | |
| 600 | 1.1 | 1.0 | 1.0 | 0.9 | 0.9 | 0.9 | |
| 900 | 1.2 | 1.1 | 1.1 | 1.0 | 1.0 | 1.0 | |

$P_b$ ↓

(mmHg)

GAS ENGINE

(APPLICABLE FIELD)

The invention relates to gas engines including gas engines of pre-chamber (pre-combustion-chamber) type used for driving electric generators, co-generation system, and other.

(BACKGROUND ART)

As shown in FIG. 25, an conventional gas engine of the pre-chamber type includes a main chamber 10 (main combustion chamber) and a pre-chamber 12 connected thereto. Lean mixture of fuel and air is supplied through an intake port 14. Rich mixture of fuel and air is formed in the pre-chamber 12 by the fuel gas supplied through a gas pipe 18. A spark plug 20 initially ignites the rich mixture in the pre-chamber 12 to cause combustion in the main chamber 10 so as to achieve low fuel consumption and clean exhaust gas.

15 is a gas regulator, 16 is a throttle valve, 17 is a mixer, 19 is an igniter, 21 is a lubricating oil pipe, 23 is a pump, 25 is an intake valve, 26 is an exhaust valve. A gas pipe 18 is provided with a check valve 24, which is disclosed in the Japanese patent application No. 63-37946 by the applicant. The check valve 24 is operable to be opened by a negative pressure in the chamber 12 and closed by the positive chamber (FIG. 26).

If the engine as described above is large in sizes, the mixture flows in the pre-chamber 12 at excessively high velocity, which deteriorates ignitability in the chamber 12, as stated in the Japanese Utility publication No. 55-14749.

In FIG. 26, the pre-chamber 12 is formed in a body 125 which is screwed into a cylinder head 126 with a packing 127 therebetween. The top end of body 125 is welded to the sleeve 128 to which the plug 20 and the check valve 24 are attached.

The upper portion of the check valve 24 is located in a space 130 connected to the gas pipe 18. The lower portion of the valve 24 is disposed in a space 131 connected to the pre-chamber 12. Thus, the check valve 24 controls the flow of the gas from the gas pipe 18 into the pre-chamber 12 through the space 131.

As shown in FIG. 27, the check valve 24 comprises a valve holder 132, a valve guide 133, a valve stem 134 slidably fitted in the guide 133, a valve body 135 and a valve spring 136. The negative pressure applied to the valve body 135 in the intake stroke descends it away from a valve seat 137 against the elastic force by the spring 136, and thus the valve 24 opens. The upper space 130 is formed in a cap 139, and a lower space 138 is formed in the valve guide 133.

In the prior art structures, when the pressure in the space 130 decreases, it may become difficult to supply the gas to the chamber 12.

Further, a difference between the pressures in the spaces 130 and 138 may restrain the opening operation of the valve body 135, and thus causes a delay thereof, which results in unpreferable opening characteristics. The Japanese patent publication 62-331 relates to this matter.

In order to maintain an ideal mixture ratio, it is necessary to control and vary the supply pressure of the gas or the mixture to the pre-chamber in accordance with the load and engine speed.

However, there has been no method for effectively control the supply pressure to the pre-chamber.

For gas engines of three-way catalyst type without a pre-chamber, there has already been mixture ratio control apparatus, as disclosed in the Japanese laid-open publication No. 61-138840, in which a gas supply pipe and an intake pipe are connected, without through a mixer, by a bypass passage, of which opening degree is controlled by a control device.

This conventional apparatus is however of a type, in which a flow rate of the fuel gas in the bypass passage is controlled, so that precise control is impossible. Since the volume percentage of the fuel gas in the mixture is remarkably small, even if the gas flow rate changes to a small extent, it causes the change the air/fuel ratio to a large extent. In the catalyzer type, the mixture is rich and has a volume ratio, e.g., of 11, so that the mixture ratio will not exceed the combustion limit even by a rough control. However, in the lean mixture combustion type, in which the mixture has a volume ratio of about 22, the precise control is required to maintain the ratio within the combustion limit because the flow rate of the gas rapidly affects the mixture ratio of the lean mixture. Therefore, the conventional control device can not be used in the gas engine of the lean burn type. Further, the conventional device can not perform the control of the ratio in accordance with the load and engine speed.

The inventors have devised the control apparatus for the lean mixture combustion engine, in which a relief passage 364 is connected to a boost pressure compensation pipe 363, which functions to introduce a pressure in an air supply passage 361 to a gas regulator 362. In the relief passage 364, there are provided a flow control valve 365 and a shut-off valve 366, both of which are electrically controlled by a control device 377 receiving signals from a boost sensor 370, a rotation speed sensor 374 and a lean-burn sensor 376. The sensor 370 detects a pressure in a portion downstream the throttle 369 in an intake pipe 368. The sensor 374 detects teeth of a gear 377 on a crank shaft to produce output pulse signals. The sensor 376 detects residual oxygen concentration in the exhaust gas. In the control device 377 consisting of micro-computer and others, the optimum or ideal mixture ratio in relation to the engine load and speed is pre-memorized as a map. The optimum mixture ratio is read out from the map in accordance with the engine speed and load resulting from the processing of the signals from the sensors 370 and 374. The actual ratio is obtained from the signal from the sensor 376. The control valve 365 is controlled so that the actual ratio may have the ideal value. In the controlling operation, the flow of the air relieved through the passage 364 changes, and thus the air pressur introduced from the passage 363 to the regulator 362 changes, so that the mixture ratio varies to the optimum value. In an accelerating operation, the control unit 377 controls the shut-off valve 366 to close, so that the supply gas pressure increases, resulting in the rich mixture. In FIG. 28, 371 is a cylinder, 372 is a piston 372, 379 is a gas supply pipe, 380 is a mixer, 382 is a spark plug, 383 is an intake valve, and 384 is an exhaust valve.

Although the device described above is superior to the previously stated device, it controls the gas supply pressure, so that the change of the opening degree of the valve 365 causes rapid change in the mixture ratio, and thus the sufficiently precise control is impossible.

(DISCLOSURE OF THE INVENTION)

The first object of the invention is to provide a gas engine provided with a pre-chamber of such a shape that the formation of the mixture in the pre-chamber can be improved.

The second object of the invention is provide a check valve device in a gas engine of a pre-chamber type, in which gas is effectively supplied to the pre-chamber even at a low gas pressure, and the valve operation characteristics are improved.

The third object of the invention is to provide a method of controlling the gas pressure in a pre-chamber in a gas engine, in which a supply pressure of gas or mixture to the pre-chamber can be controlled well.

The fourth object of the invention is to provide a mixture ratio control apparatus in a gas engine without a pre-chamber, which can precisely control the air/fuel ratio.

(CONSTITUTION OF THE INVENTION)

(1) Technical Means

In a gas engine of a pre-chamber type, a pre-chamber is arranged in communication to a main combustion chamber, an intake passage is arranged to supply lean mixture to the main chamber, a gas pipe is arranged to form rich mixture in the pre-chamber by fuel gas, and the rich mixture in the pre-chamber is ignited by a spark plug prior to combustion of the lean mixture in the main chamber, and it is characterized in that a sectional area of the pre-chamber gradually decreases toward the main chamber.

(2) Operation

The pre-chamber having the shape described above causes circulation flow of the mixture in the pre-chamber, which improves forming the mixture.

(DETAILED DESCRIPTION OF THE PREFERRED EMBODIMENTS)

Figure 1:
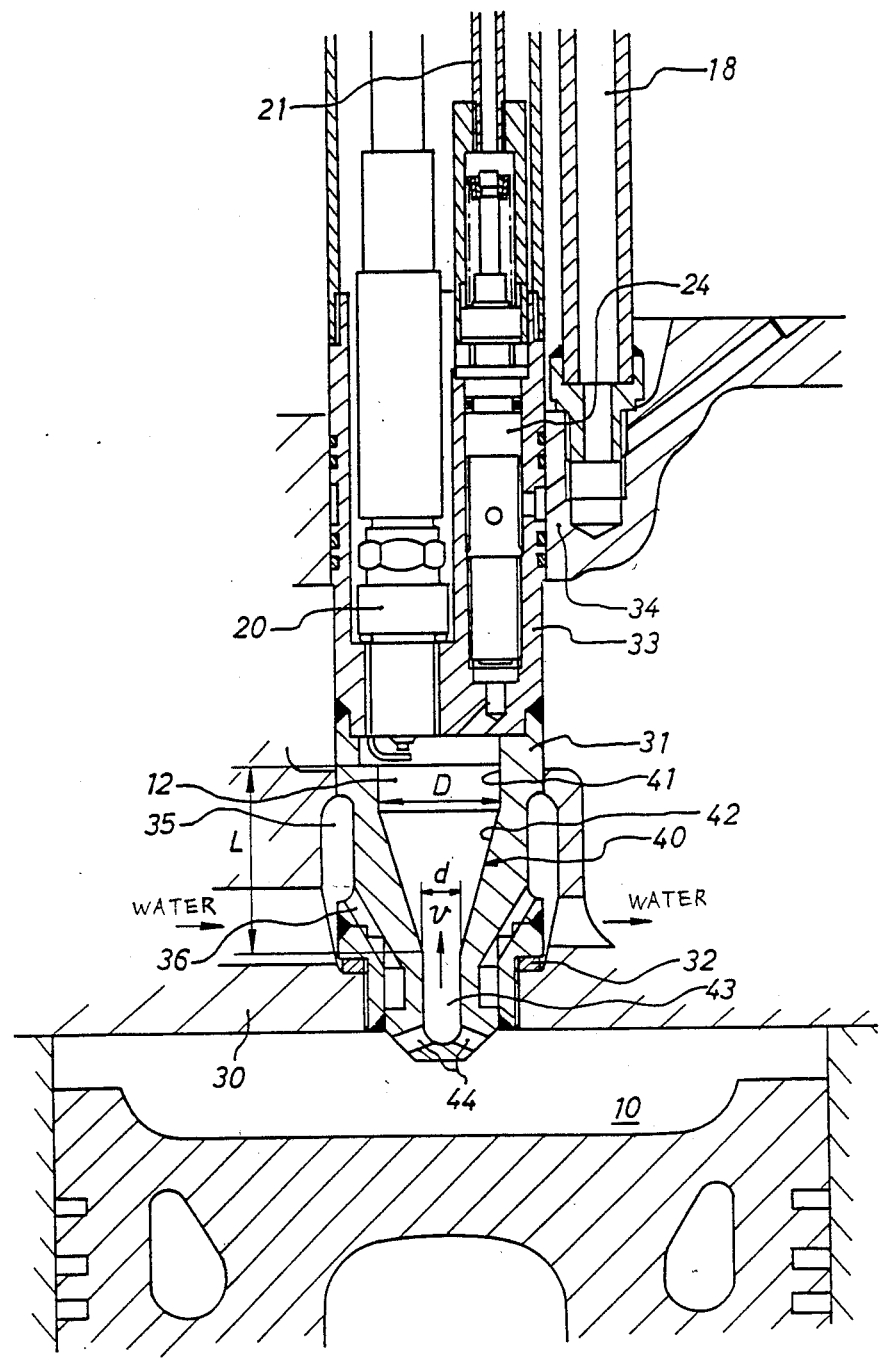
FIG. 1 is a sectional view of a major part of a gas engine of a pre-chamber type according to the invention.

FIG. 1 illustrate a gas engine of a pre-chamber type, of which bore is 100 mm or more. In FIG. 1, same or similar parts and members as those in FIG. 25 bear same numbers.

A pre-chamber body 31 is screwed into a cylinder head 30 with a packing 32 therebetween. The upper end of the body 31 is welded to a sleeve 33, in which a spark plug 20 and a check valve 24 is arranged. The valve 24 selectively opens and closes a gas passage 18, of which lower end 34 is in communication to the chamber 12, and is inclined with respect to a center line of the body 31. A cooling water passage 35 is formed around the body 31 and is connected to a passage 36 therein.

An inner surface 40 of the body 31 determining the chamber 12 has a cylindrical surface 41 and a tapered surface 42, and thus has a substantially inverted conical shape. The lower end of the space surrounded by the tapered surface 42 connects to three ports 44 through a passage 43 having a circular section.

A height or length L of the pre-chamber 12 and diameters D and d of larger and smaller ends of the tapered surface 42 have following relationship.

$$d/D = 0.3 \tag{1}$$

$$L/D = 1.5 \approx 2.0 \tag{2}$$

The condition (1) is set for well mixing of the gas in the pre-chamber 12 and lean mixture in the main chamber 10 in a compression stroke. The condition (2) is set for well mixing of the fuel gas and air in the pre-chamber 12 as well as good combustion and ignitability.

The height of the cylindrical surface 41 may be varied, or the cylindrical surface 41 may be eliminated.

According to the afore-mentioned embodiment, the negative pressure in the main chamber 10 causes the fuel gas to flow into the pre-chamber 12 through the gas pipe 18 in the intake stroke of the engine. In the subsequent compression stroke, the lean mixture in the main chamber 10 is compressed and flows to the pre-chamber 12 through the ports 44 and the passage 43 at a velocity of v (m/s), and thus is mixed with the fuel gas filling the pre-chamber 12.

Figure 2:
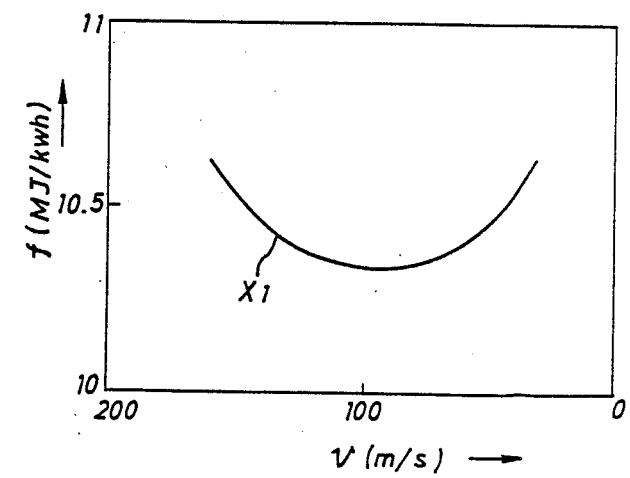
FIG. 2 is a graph of velocity of jet flow and fuel consumption.
Figure 27:
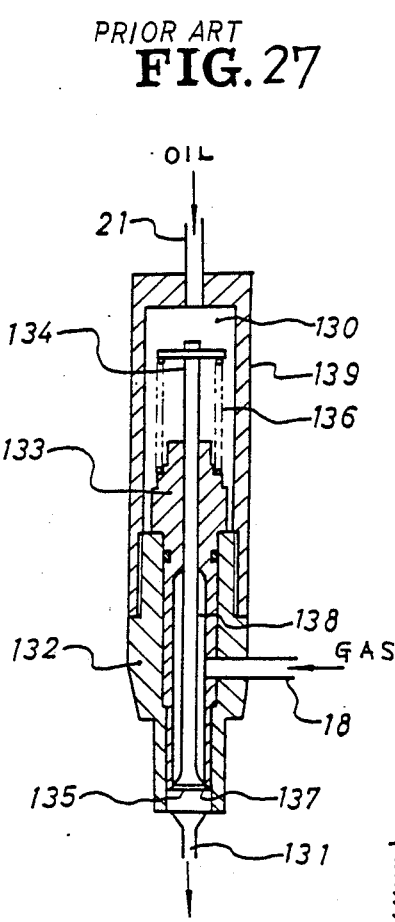
FIG. 27 is a sectional view of a conventional check valve.

The velocity v affects the combustion condition. As shown in FIG. 2 illustrating relationship between fuel consumption f (MJ/KWh) and the velocity v, if the velocity v is 160 m/s or more, the mixture does not ignite due to the blowoff. If the velocity is 30 m/s or less, the cyclic variation is very widely, and thus the stable driving is impossible. According to the characteristics X1 in FIG. 2, the fuel consumption f becomes best at the region in which the velocity v is about 90 m/s.

As stated above, the flow of the velocity of v from the passage 43 can be deemed as a jet flow. The shape of the inner surface 40 of the pre-chamber 12 is so determined that the intended rich mixture may be formed in the pre-chamber 12 by this jet flow, as stared below.

First of all, the conditions for forming the intended rich mixture throughout the pre-chamber 12 will be described in connection with said equation (1). According to a reference "TURBULENT JETS" (N. Rajaratnam, Elsevier Scientific Publishing Company, Amsterdam, 1976), a flow rate W of the jet flow can be expressed as follow, provided that the it flows through a cylindrical passage.

$$\frac{d}{dx} \int_0^{R_o} (p + \rho \times u^2) \, r \, dr = 0$$

$$\frac{dW}{dx} = 0$$

$$W = \int_0^{R_o} (p + \rho \times u^2) \, r \, dr$$

$x$: axial position of the passage
$r$: radial position
$R_o$: radius of the passage
$p$: pressure in the passage
$\rho$: density
$u$: flow velocity A non-dimension parameter H is as follow.

$$H = \{1/(2\pi)^{\frac{1}{2}}\} \times \{Q/(W/P \times R_o)^{\frac{1}{2}}\} \quad (3)$$
$$= \frac{1}{2}(m + \frac{1}{2})^{\frac{1}{2}}$$
$$= \frac{1}{2}(1 + 2/Ct^2)^{\frac{1}{2}} \quad Q: \text{flow rate}$$

$$Ct = 1/m^{\frac{1}{2}}$$

As apparent from the above, the size of the turbulent region is determined by the coefficient Ct. The "m" is a coefficient defined by Curted and Ricon in 1964 together with the Coefficient Ct, and is determined so that the non-dimension parameter H may be modified into the equation (3). The coefficient Ct is a coefficient for determining the size of a recirculation region caused by the flow jet. According to said reference, the turbulent region fills the passage at the Ct=0.3.

On the other hand, according to the treatise published on ASME paper in 1984 by a company named "Ingersoll-Rand", the flow rate Mr required for re-circulation in an infinitely long tube can be determined as follows.

$$Mr = \int_{BDC}^{SA} (\pi/4)d^2 \times \rho \times u_e \, (0.32/Ct - 0.43) \, dt \quad (4)$$

SA: e.g., a certain time
BDC: E.g., a certain time
$\sigma$: density
$u_e$: velocity in throat In the equation (4), the coefficient Ct can be simplified as follows.

$$Ct = [(D/d)^2 - \frac{1}{2}]^{-\frac{1}{2}}$$

Therefore, the value of d/D substantially becomes as follows when the Ct is 0.3.

$$d/D \approx 0.3$$

Figure 3:
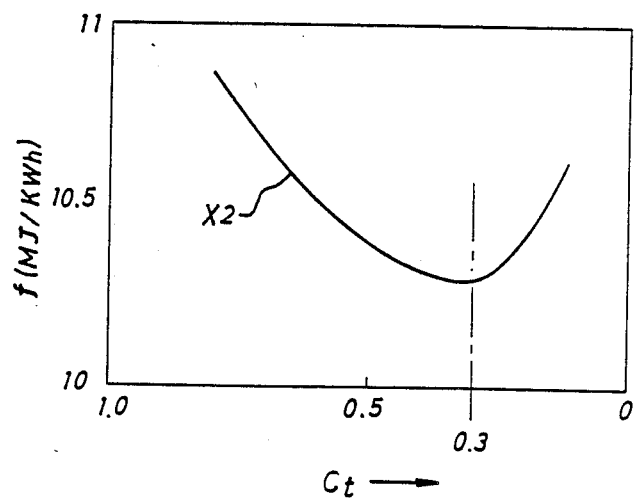
FIG. 3 is a graph of coefficient Ct and fuel consumption.

According to experiments for the engine in FIG. 1 having the cylinder diameter of 100 mm of more, when the Ct is 0.3, the fuel consumption f becomes minimum as shown in the characteristics X2 in FIG. 3.

Figure 4:
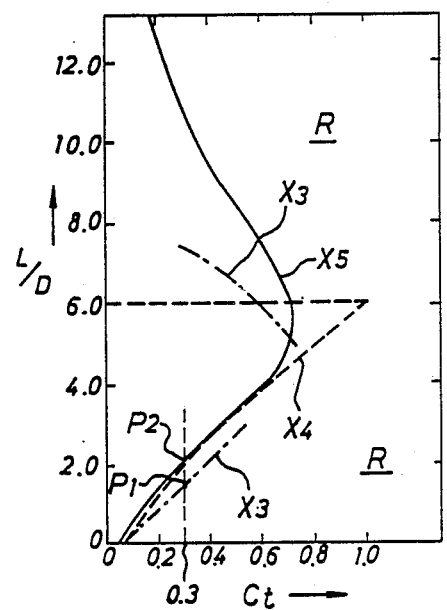
FIG. 4 is a graph of coefficient Ct and coefficient L/D.

Then, the condition in said equation (2) will be described below. In connection with the reference "TURBULENT JETS", reference is made to FIG. 4 in which L is an length through which the turbulent region is generated by an axially symmetrical passage flow in the cylindrical passage having the diameter of D. There is a turbulent region in a region R of the characteristics X5 by the experiment of Hill, the characteristics X4 by experiment of the Curtet and Barchilon and characteristics X3 by the experiment of Becker et al. When the coefficient Ct is 0.3, the turbulent region is generated in a region between L/D=1.5 at the intersection P1 with said characteristics X3 and L/D=2.0 at the intersection P2 with the characteristics X5. Therefore, good mixture is obtained in the area of L/D=1.5≈2.0, and the inferior mixture is formed in other area.

According to the experiments by the inventors, if the L/D is of a value less than 1.5, the inferior mixture is formed, and when the L/D is of a value larger than 2.0, it takes too long time until the flame in the pre-chamber 12 reaches the main chamber 10, resulting in inferior combustion. Therefore, even in the large engines having a cylinder diameter of 100 mm or more, good combustion is achieved in the condition defined in said equation (2).

(EFFECT)

As stated hereinbefore, the gas engine of the pre-chamber type according to the invention achieves following effects.

According to claim 1, since the sectional area of the pre-chamber 12 is gradually reduced toward the main chamber, the jet flow flows into the pre-chamber 12 at an appropriate velocity, so that good combustion is obtained in the pre-chamber 12 even in the large engine having the cylinder diameter of 100 mm or more. The reasons thereof are as follows. If the pre-chamber 12 is of cylindrical shape, the jet flows through the throat at an excessively high velocity in high speed medium engines, resulting in blow-off. However, the pre-chamber 12 having said shape has a relatively small capacity, so that the velocity of the flow jet in the throat is low, and thus the blowoff does not occur. It has been confirmed in the experiments by the inventors that the good mixture is formed even in the pre-chamber 12 having said shape.

According to the claim 2, as shown in FIG. 1, the conditions are set as follows.

$$d/D = 0.3 \quad (1)$$

$$L/D = 1.5 \approx 2.0 \tag{2}$$

Therefore, it is possible to achieve superior formation of the lean mixture in the pre-chamber by the equation (1) as well as superior combustion and propagation of the flame by the equation (2).

Then, a check valve according to the invention will be described hereinafter. The means for accomplishing the second object of the invention is as recited in claim 6.

This check valve operates as follows.

Since pressures in both of main chamber and prechamber are balanced through a connecting passage, a check valve body can open rapidly, resulting in good opening characteristics of the valve body.

Since both open ends are apart from each other, the lubricating oil will not mix with the gas, and thus deposit is reduced.

Figure 25:
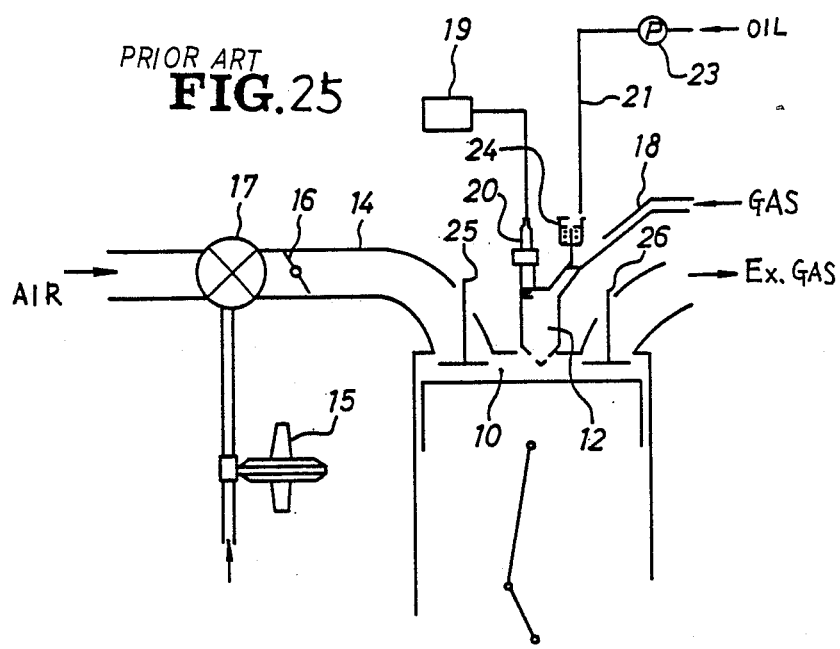
FIG. 25 is a schematic view illustrating a conventional gas engine.
Figure 5:
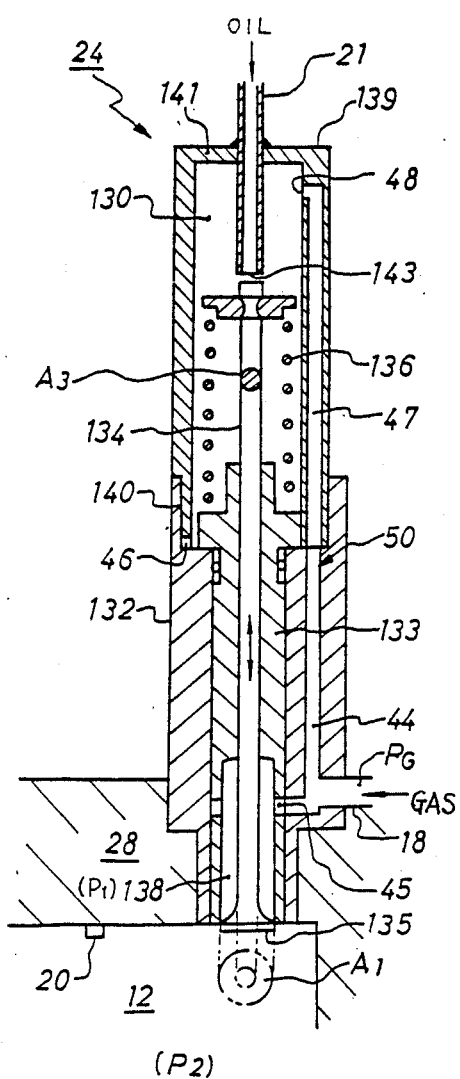
FIG. 5 is a sectional view of a check valve of a first embodiment of the present invention.

FIG. 5, which illustrates the check valve according to the invention, is an enlarged view of a part I in FIG. 25. In FIG. 5 portions same as or corresponding to those in FIG. 25 and others bear same reference numbers.

In FIG. 5, the check valve 24 includes a valve holder 132 to which a cylindrical cap 139 closed at an upper end wall 141 is screwed through a threaded portion 140. A lubricating oil pipe 121 extends through the wall 141 into the upper space 130. An open end 143 of the pipe 121 is located vertically above a valve stem 134.

Figure 26:
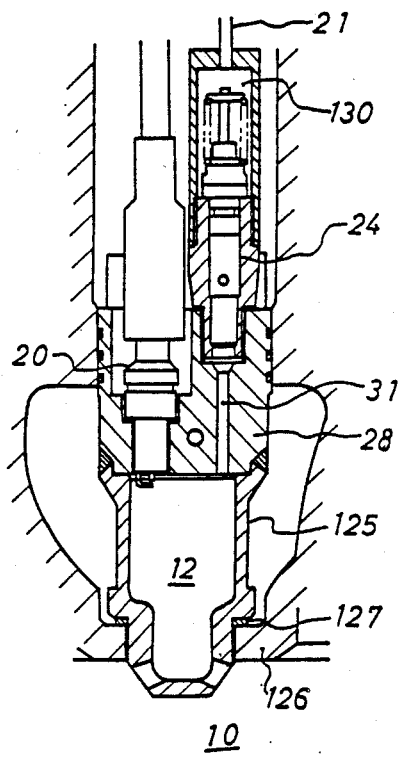
FIG. 26 is an enlarged sectional view of the engine in FIG. 25.

A valve holder 132 fitted into the sleeve 128 (FIG. 26) has a passage 44, of which lower end is connected to a lower space 133 through a port 45 in a valve guide 133. The upper end 44 of the passage connects to a passage 47 formed in the wall of the cap 139. The passages 44 and 47 will be connected to each other through an annular groove 46 formed in the lower surface of the cap 139, when the circumferential position of the cap 139 can not be set to directly connects both passages together. The upper end 48 of the passage 47 opens to the uppermost portion of the space 130. These passages 44–47 form a connection passage 50. The gas pipe 18 connects to the passage 44.

Thus, the open ends 43 and 48 are located at the positions remote from each other, and the oil supplied from the end 43 into the space 130 does not flow through the passage 50 into the lower space 138 and thus the pre-chamber 12.

An operation is as follows. The check valve 24 in FIG. 5, the gas pressure P1 in the gas pipe 18 is applied to the lower space 138, so that the valve body 135 receive a valve opening force F expressed in the following equation, in which P2 is a pressure in the pre-chamber 12, and A1 is an area of the valve body 135.

$$F1 = A3 \times (P1 - P2) \tag{5}$$

On the other hand, provided that P3 is the pressure in the upper space 130 of the conventional structures without the connecting passage 50, the pressure P3 is lower than the pressure P1. If the stem 134 has an area of A3, a following force F1 acts to pull up the valve stem 134 in the opening operation.

$$F1 = A3 \times (P3 - P1) \tag{6}$$

The attractive force F1 caused by the difference between the pressures in the spaces 130 and 138 restrains the opening operation of the valve. However, in FIG. 5, since the spaces 130 and 138 are connected through the passage 50, the pressures in the spaces 130 and 138 are balanced, and the pressure P1 is same as the pressure P3.

Figure 6:
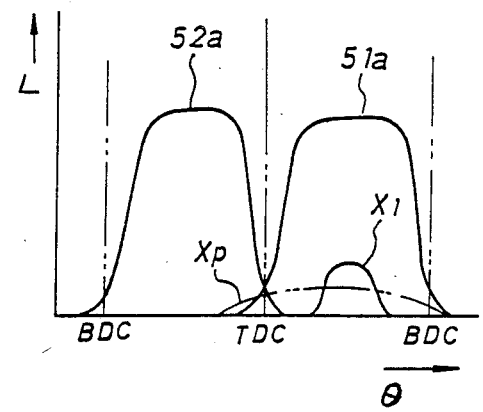
FIG. 6 is a graph of crank shaft angle and valve lift.

Therefore, the attractive force F1 does not act in the check valve 24, the check valve 24 is opened by the negative pressure in the midway in the opening period of the intake valve 51 (FIG. 25) as shown in the characteristics X1, while the intake valve 51 and the exhaust valve 52 operate in accordance with lift characteristics 51a and 52a. FIG. 6 is a graph of a crank angle and valve lift L. The characteristics X1 shows a fact that the intake valve 51 rapidly opens without loss of the gas, which is caused in the conventional structures, in which the difference of the pressures in the spaces 130 and 131 causes a characteristics Xp and opening of the check valve 24 in the opening operation of the exhaust valve.

The gas pressure $P_G$ in the gas pipe 18 should be higher than the pressure P2 in the pre-chamber P2. As the flow rate of the gas increases, the pressure P1 in the lower space 138 increases. There is a limit in the pressure $P_G$ of the gas in the gas pipe 18 supplied from the conventional city gas pipe. It is preferable that the pressure P1 in the lower space 138 does not become too high.

Figure 7:
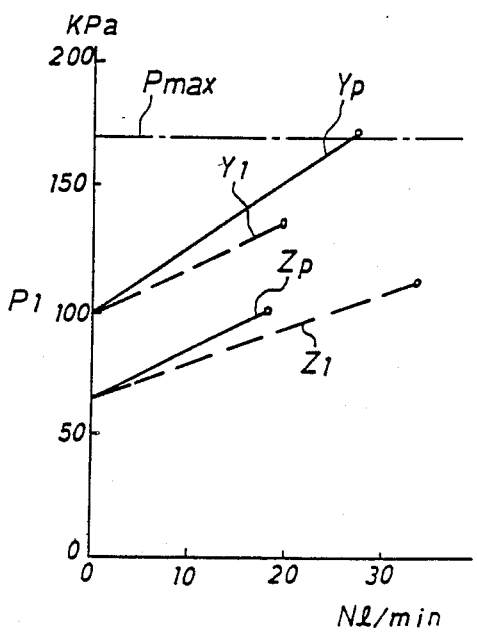
FIG. 7 is a graph of gas flow and gas pressure.

That is; as shown in FIG. 7 which is a graph relating to the pressure P1 Kpa (100 KPa = 1 kg/cm$^2$) in the lower space 138 and the gas flow rate N (liter/min.), if the passage 50 were not provided, the pressure $P_G$ would reach the maximum value Pmax at the flow rate N of about 25 liter/min. along characteristics Yp, and thus the gas could not be supplied to the pre-chamber 12. When the passage 50 is provided, the characteristics Y1 becomes slower, and the further supply to the pre-chamber 12 is possible. Zp is characteristics when the check valve 24 without the passage 50 operates in the atmosphere. Z1 is characteristics when the passage 50 is provided.

Figure 8:
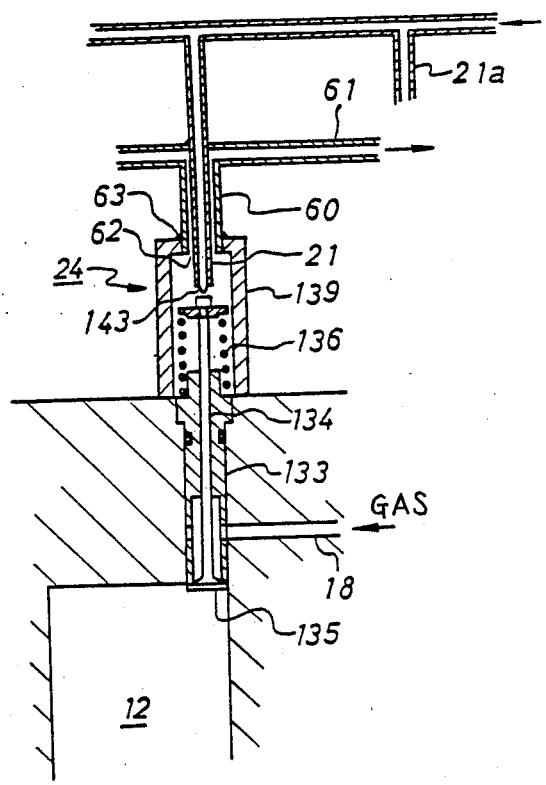
FIG. 8 is a sectional view of a check valve of a second embodiment.

In the second embodiment of the check valve 24 in FIG. 8, the connecting passage 50 is formed by a pipe 60 surrounding the pipe 21 as well as a main pipe 61 connected to the pipe 18. The open end 62 of the pipe 60 is vertically spaced from the open end 43 and opens to the upper end of the space 130. The pipe 60 is welded at a portion 63 to the cap 139. A lubricating oil pipe 21a is also connected to other cylinders (not shown) in a manner as illustrated in FIG. 8.

This second embodiment is suitable to a case, in which the cap 139 is thin, and thus the connecting passage can not be formed in the wall thereof.

Figure 9:
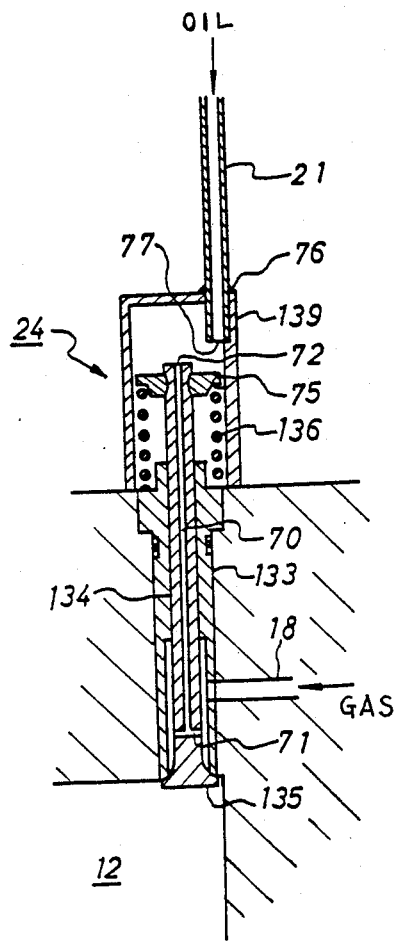
FIG. 9 is a sectional view of a check valve of a third embodiment.

In the third embodiment of the check valve 24 in FIG. 9, the connection passage 50 is formed by passages 70 and 71 formed in the valve stem 134 as well as the gas pipe 18. An open end 72 of the passage 70 opens at the upper end of the valve stem 134. The lubricating oil pipe 21 is shifted to a position along an inner surface 75 of the upper space 130 and is welded at a welded portion 76 thereto. Therefore, the oil flows from an open end 77 along the inner surface 75 without entering into the open end 72.

This third embodiment can be facilely assembled and can be arranged in a narrow space.

(EFFECT)

According to the invention, there is provided a check valve device as recited in claim 6. Therefore, the pressures in the both spaces 130 and 138 are balanced through the connection passage 50, so that the valve 135 can rapidly open, and thus the opening characteristics of the valve body 35 are improved.

Since the open ends 43 and 48 are spaced from each other, it is possible to prevent the mixing of the lubricating oil with the gas, and thus the deposit is reduced.

Then, a pressure control method for a pre-chamber in a gas engine according to the invention will be described hereinafter.

In order to accomplish the third object, there is provided the method as recited in claim 11.

An operation is as follows:

A change of an intake negative pressure Pa corresponds to a change of a load, and a change of a boost pressure Pc corresponds to a change of a rotation speed. Therefore, a gas pressure control can be appropriately performed in accordance with the loads and rotation speed of the gas engine by controlling a supply pressure Pg in accordance with of an equation revited in claim 11. Due to existence of a constant C, the gas or the mixture can be supplied even at the starting operation of the engine in which the intake pressure Pa and the boost pressure Pc are zero.

An embodiment of the gas pressure control method for the pre-chamber according to the invention is described with reference to FIGS. 10-14.

Figure 10:
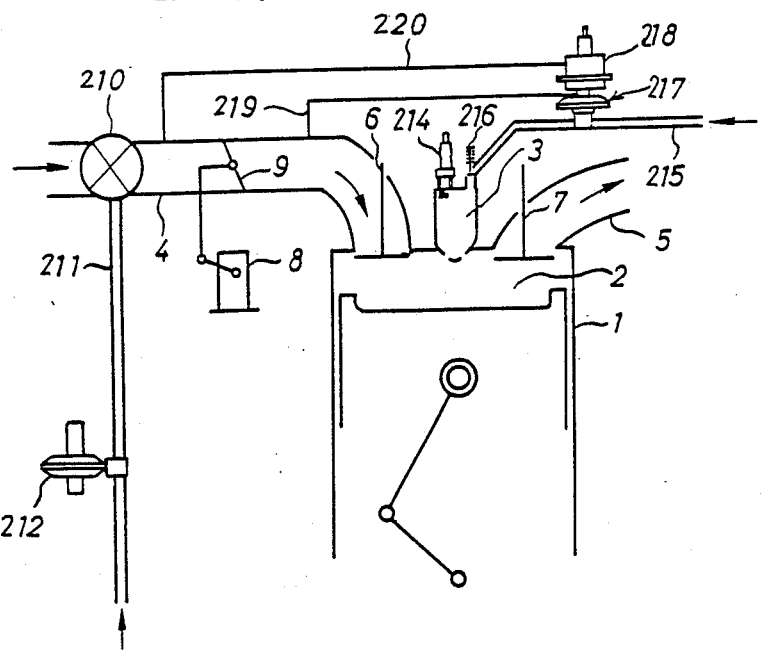
FIG. 10 is a schematic view of a gas engine employing a pre-chamber gas pressure control method of the embodiment.

In FIG. 10, a cylinder 1 of the engine includes a main chamber 2 and a pre-chamber 3 as well as intake and exhaust pipes 4 and 5 connected to the main chamber 2. Intake and exhaust valves 6 and 7 are associated to the main chamber 2. A throttle 9 driven by a governor 8 is disposed in the intake pipe 4. An inlet of the pipe 4 is connected through a mixer 210 to a gas supply pipe 211 to which a gas regulator 212 is associated.

A spark plug 214 is associated to the pre-chamber 3. A gas supply pipe 215 is connected to the pre-chamber 3 through a check valve 216. The gas supply pipe 215 is provided with a regulator 217, which includes an auxiliary diaphragm 218 and is connected through a negative pressure conduit 219 to a portion of the inlet pipe 4 downstream the throttle 9, and is also connected through a boost pressure conduit 220 to a portion of the pipe 4 between the throttle 9 and the mixer 210.

Figure 11:
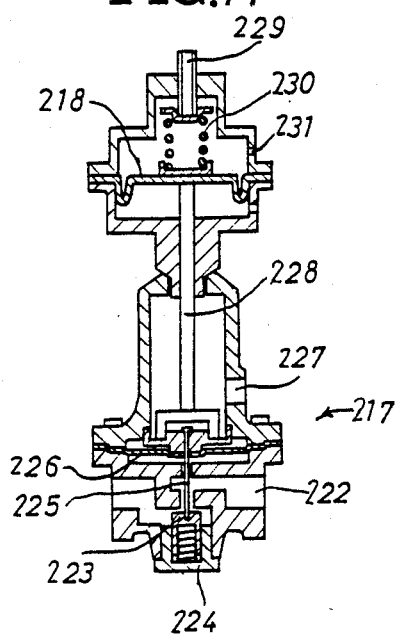
FIG. 11 is a sectional view of a regulator for a pre-chamber.

The regulator 217 for the pre-chamber includes, as shown in FIG. 11, a valve 223 for selectively opening and closing a gas passage 222, a first spring 224 biasing the valve 223 upwardly and a main diaphragm 226 connected to said valve 223 through a first rod 225. The upper surface of the main diaphragm 226 receives an intake negative pressure introduced from the conduit 219 through an inlet 227. The main diaphragm 226 is connected through a second rod 228 to the auxiliary diaphragm 218, which is biased downwardly by a second spring 230. The position of the upper end of the spring 230 is set by an adjustable bolt 229. The upper surface of the diaphragm 218 receives a boost pressure introduced from an inlet 231 through the conduit 220.

Although it is nor shown, an intake negative pressure and boost pressure are introduced into the regulator 212 for the main chamber. Further, there is provided a lean burn sensor which detects the concentration of the oxygen in the exhaust gas and produces a voltage corresponding to the air/fuel ratio in the chamber 2, as well as a control device which controls the boost pressure introduced into the regulator 212 on the basis of the outputs from the lean burn sensor and, so that the pressure in the pipe 211 is controlled so as to set the air/fuel ratio of the mixture supplied from the pipe 4 into the chamber 2 at an intended value.

Figure 12:
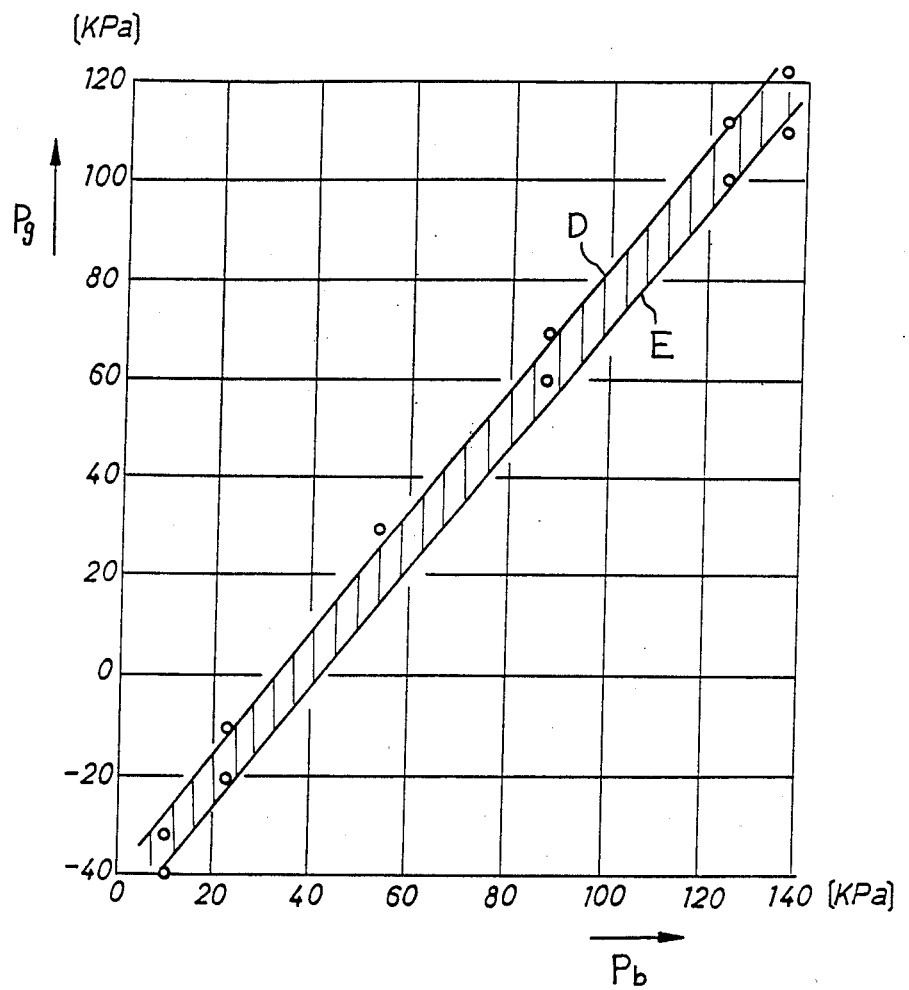
FIG. 12 is a graph illustrating relationship between a boost pressure and a gas supply pressure to a pre-chamber.

Referring to FIG. 12, which illustrates a relationship between the boost pressure Pb and the gas supply pressure Pg to the pre-chamber 3, a combustion region is formed between solid lines D and E. As seen from FIG. 3, the gas supply pressure should be increased as the load increases.

Figure 13:
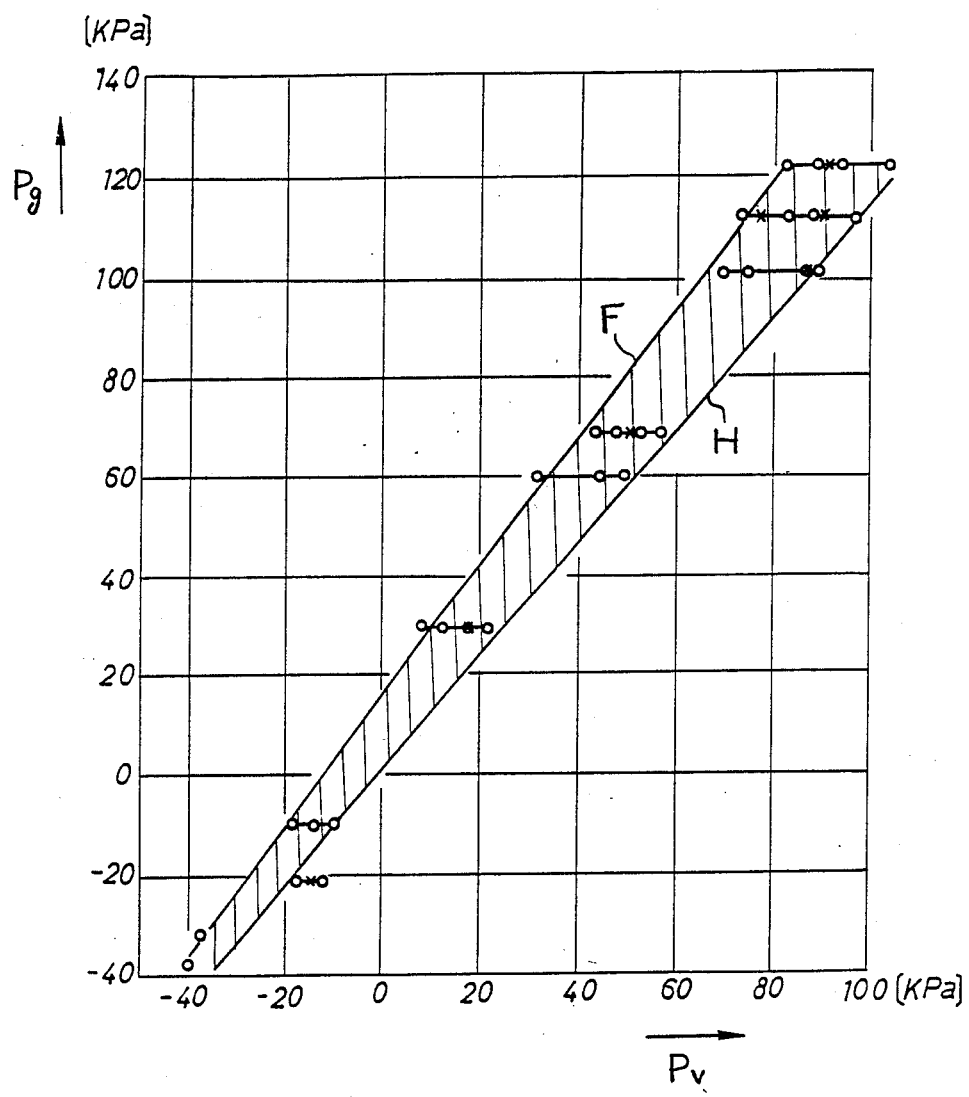
FIG. 13 is a graph illustrating relationship between an intake negative pressure and a gas supply pressure to a pre-chamber.

Referring to FIG. 13, which illustrates a relationship between the intake negative pressure Pv and the gas supply pressure Pg to the pre-chamber 3, a combustion region is formed between solid lines F and H. As seen from FIG. 13, the intake negative pressure corresponds to the opening degree of the throttle, i.e., to the engine speed, and the gas supply pressure should be increased as the engine speed increases. In order to decrease the density of $NO_x$ in the exhaust gas, it is necessary to reduce the air/fuel ratio in the main chamber 2. For this purpose, the flow rate of the air should be increased with respect to that of the gas by opening the throttle, whereby the negative pressure in the cylinder 1 is reduced, which may suppress the rapid flow of the gas into the cylinder, so that the gas supply pressure to the pre-chamber 3 should be increased.

An operation is as follows. The air supplied from a charger (not shown) into the intake pipe 4 is mixed by the mixer 210 with the gas regulated by the regulator 212 to form the lean mixture, and is supplied into the main chamber 2.

The gas in the supply pipe 215 for the pre-chamber is regulated by the regulator 217 and is supplied through the check valve 216 into the pre-chamber 3. The diaphragm 226 in the regulator 217 receives the negative pressure from the inlet 227 as well as the force applied through the second rod 228 by the auxiliary diaphragm 218, which receives the boost pressure from the inlet 231 and the elastic force by the second spring 230. The the force of the diaphragm 226 is balanced with the elastic force by the first spring 224. As the force acting downwardly on the diaphragm 226 becomes large, the valve 223 downwardly moves a longer distance to increase the gas supply pressure.

That is; provided that the intake negative pressure is Pa, the boost pressure is Pc, and A, B and C are constants larger than 0, the gas supply pressure Pg to the pre-chamber 3 is regulated by the regulator 217 so that it may be expressed as follows.

$$Pg = APa + BPc + C$$

The constant C is an elastic force by the second spring 230 and others, so that the valve 23 is prevented from completely closing the passage 222 even when the pressures Pa and Pc are zero. The constants A and B are determined by the pressure-receiving area of the diaphragms 226 and 218 and other structural factors in the regulator 217, and are set so that the optimum supply pressure Pg is always obtained with respect to the changes of the intake negative pressure Pa and the boost pressure Pa.

Figure 14:
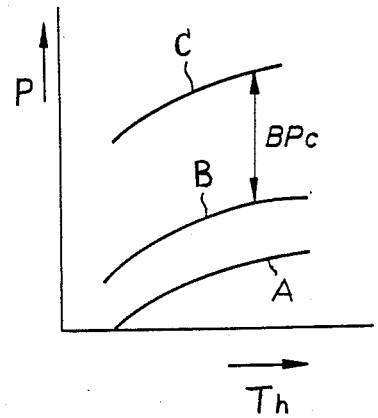
FIG. 14 is a graph illustrating relationship between an opening degree of a throttle and a gas supply pressure.

Therefore, when the throttle 9 is opened, as shown in FIG. 14, the pressure in the cylinder and the intake negative pressure increase, and thus the gas supply pressure increases. In FIG. 14 illustrating relationship between the opening degree Th of the throttle and the pressure P, a solid line A indicates the inner pressure in the cylinder 1, the solid line B is the intake negative pressure, and the solid line C is the gas supply pressure.

It is apparent also from said equation that the gas supply pressure increases even in accordance with the increased boost pressure.

As described above, since the gas supply pressure to the pre-chamber 3 is controlled in accordance with the intake negative pressure and the boost pressure, the gas is supplied to the pre-chamber 3 at the optimum pressure in accordance with the speed and load of the engine, so that the optimum air/fuel ratio is always maintained in the main chamber 2. Therefore, the ideal lean mixture can be formed, and the concentration of $No_x$ in the exhaust gas can be suppressed, as well as, it is possible to prevent stoll of the engine due to the ratio exceeding the lean limit.

The invention may be modified as follows.

Although the pipe 15 is adapted to supply only the gas to the pre-chamber 3, it may be adapted to supply rich mixture of the gas and the air.

In the embodiment described above, the mixture ratio of the lean mixture supplied to the main chamber 2 is precisely controlled by the lean burn sensor and other. This does not directly concern with the present invention. The control precision of the air/fuel ratio can also be remarkably improved by the combination of the present invention and other controlling manner.

(EFFECT)

According to the invention, as recited in claim 11, the gas supply pressure to the pre-chamber changes in accordance with the load and speed of the engine, so that the gas can be supplied to the pre-chamber at the optimum pressure in accordance with the speed and load of the engine, and thus the optimum air/fuel ratio can be maintained in the main chamber. Therefore, the concentration of $No_x$ in the exhaust gas can be suppressed, and it is possible to prevent stoll of the engine due to the ratio exceeding the lean limit. Due to the existence of the constant C, the gas can be supplied to the pre-chamber even at the starting operation of the engine, in which the intake pressure and the boost pressure are zero.

Then, a mixture ratio control apparatus of a gas engine according to the invention will be described. This gas engine is not provided with a pre-chamber. This mixture ratio control technique may be applied to the gas engines provided with the pre-chambers.

In order to achieve the fourth object, there is provided the mixture ratio control apparatus of the gas engine as recited in claim 11.

An operation is as follows.

A control device controls the flow valve for the air to change the opening degree of a bypass passage, so that the flow rate of the air in the bypass passage changes, and thus the mixture ratio changes. Since the flow rate of the air, which is remarkably large with respect to that of the fuel gas, is controlled to change the air/fuel ratio, the change of the air flow rate does not rapidly change the air/fuel ratio, so that precise control can be performed.

An embodiment of the control apparatus is described with reference to FIGS. 15-20.

Figure 15:
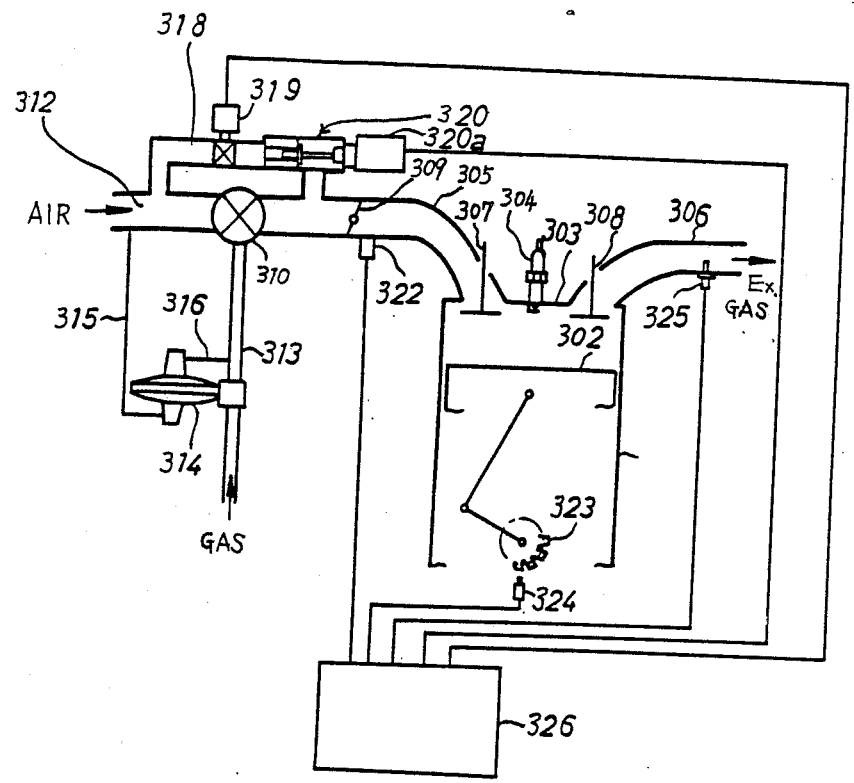
FIG. 15 is a schematic view of other embodiment.

Referring to FIG. 15, the engine comprises a cylinder 301, a piston 302 and a cylinder head 303, in which a spark plug 304. An intake pipe 305 and an exhaust pipe 306 are connected to the cylinder head 303. An intake valve 307 and an exhaust valve 308 are also arranged in the cylinder head 303. A throttle 309 is arranged in the intake pipe 305. The inlet end of the intake pipe 305 is connected to a mixer.

The mixer 310 has an inlet connected through an air supply passage 312 to an air source (not shown) and other inlet connected through a gas supply passage 313 to a gas source (not shown). The passage 313 is provide with a gas regulator 314, to which the pressure in the passage 312 is introduced through a pipe 315. The pressure at a portion in the passage 313 downstream the regulator 314 is also introduced to the regulator 314 through a pipe.

The air passage 312 and the intake pipe 305 is connected through the bypass passage 318 detouring the mixer 310. In the bypass passage 318, there is provided an electrically controlled shut-off valve 319 for selectively opening and closing it, and there is also provided an electrically controlled flow control valve 320 downstream the valve 319 for controlling the opening degree of the bypass passage 318.

At a portion of the intake pipe 305 downstream the throttle 309, there is provided a boost sensor 322 which functions as a load sensor for detecting the pressure in the intake pipe 305. At the vicinity of a gear 322 mounted on a crank shaft of the engine, a rotation speed sensor 324 is arranged for detecting the teeth of the gear 322 to produce pulse signals in accordance with the rotation speed of the engine. The exhaust pipe 306 is provided with a lean burn sensor 325 for detecting the density of the residual oxygen in the exhaust gas in the pipe 306. These sensor 322, 324 and 325 are electrically connected to input terminals of a control device 326. Output terminals of the control device 326 are connected to control signal input terminals of the solenoids in the shut-off valve 319 and a stepping motor 320a in the control valve 320.

Figure 16:
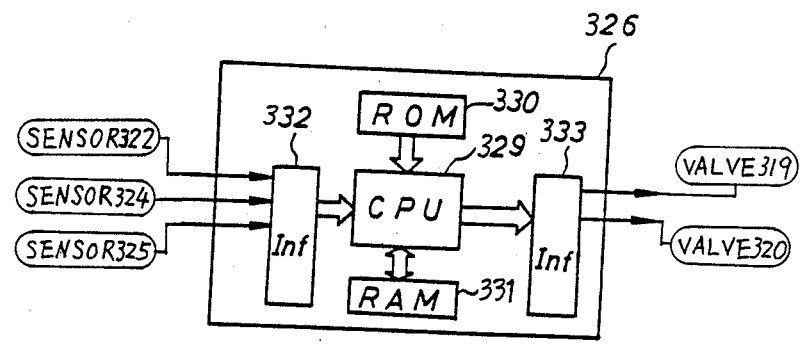
FIG. 16 is a diagram of a control device.

The control device 326 consists of, e.g., a microcomputer, and includes, as shown in FIG. 16, a center processing unit 329 (CPU) for processing the input signals in accordance with a program, ROM 330 (read only memory(s)) and RAM 331 (random access memory(s)) for memorizing data and program, an input interface 332 between the CPU 329 and sensors 322, 324, 325 and others, and an output interface 333 between the CPU 329 and said valves 319, 320 and 333 and others.

An operation is as follows. The air in the passage 312 and the fuel gas in the passage 313 are mixed by the mixer 310 to form the lean mixture, which is supplied through the intake pipe 305 and the valve 307 into a combustio chamber in the cylinder 301, and is ignited therein by the spark plug 304. The exhaust gas in the combustion chamber is discharged through the valve 308 and the pipe 306 to the charger (not shown). Due to the exsistence of the mixer 310, the pressure in the air passage 312 is higher than that in the pipe 305, so that the air in the passage 312 is partially supplied through the bypass passage 318 to the inlet pipe 305. The flow rate in the bypass passage 318 is determined by the control valve 320 controlled by the control device 326, so that the flow rate in the inlet pipe 305 can be controlled by the device 326 to achieve the optimum mixture ratio. When it is required to form rich mixture, e.g., in an acceleration operation, the control device 326 controls the valve 319 to close it, so that the air does not flow through the bypass passage 318, and thus the quantity of the air supplied to the pie 305 decreases, resulting in the rich mixture.

Figure 17:
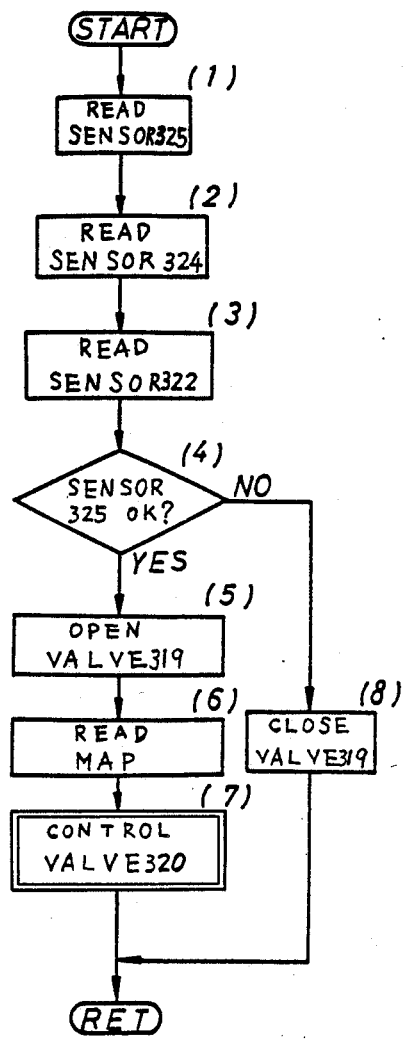
FIGS. 17 and 18 are flow charts of operations of a control device.
Figure 18:
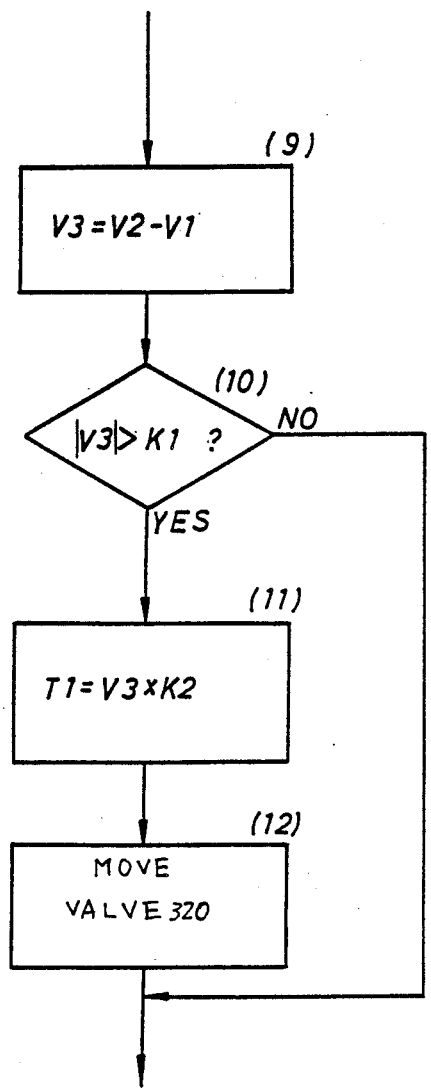
Figures 19, 20:
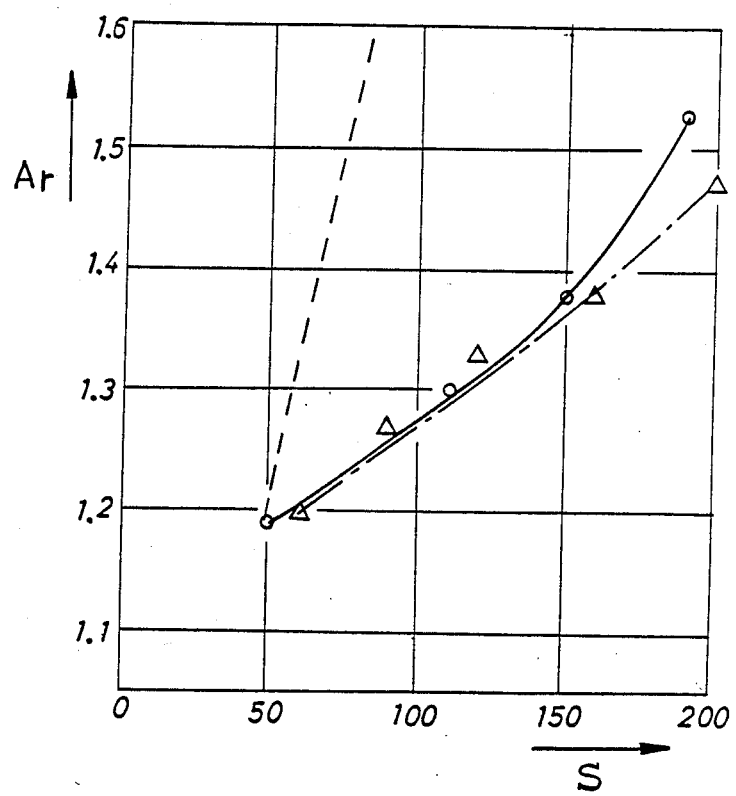
FIG. 19 is a table illustrating a map memorized in a control device.
FIG. 20 is a graph illustrating relationship between an opening degree of an air flow control valve and an excess air ratio.

In the above operation, the CPU 329 specifically operates as shown in FIGS. 17 and 18. At step (1), the CPU 329 reads the value V1 of an output voltage of the lean burn sensor 325 and writes it in the RAM 331. This value corresponds to the present actual mixture ratio 1. In the subsequent step (2), it counts the output pulses from the speed sensor 324 for a predetermined time and writes the number of them in the RAM 331. This number corresponds to the engine speed (e.g., rpm). In the step (3), it reads the output voltage of the boost sensor 322 and writes the boost pressure calculated therefrom in the RAM 331. The boost pressure corresponds to the load of the engine. In the following step (4), it is determined whether the output of the lean burn sensor is normal or not. Since the resistance of the lean burn sensor 325 changes to a large extent when it becomes abnormal, the above determination can be performed based on the output thereof. If it is determined that the sensor 325 is normal, the process moves to the step (5), in which the air shut-off valve 319 is opened by an output signal, which is latched until the subsequent output signal to the valve 319 is produced or the CPU 329 stops. Instead of the control device 326, the valve 319 may have the latching function. In the following step (6), an ideal output voltage value V2 for the lean burn sensor 325 is read from a map memorized in the RAM 331 in accordance with the engine speed and the boost pressure obtained in the steps (2) and (3), respectively. Said map in the RAM 331 is illustrated in FIG. 19, and the values V2 in the map are converted from the ideal mixture ratios 2. For example, the value corresponding to the ideal mixture ratio is 0.9V when the engine speed is 600 rpm and the boost pressure is 200 mmHg. The process moves to the step (7) for controlling the stepping motor 320a in the control valve 320, which will be detailed later, and then returns to the step (1). On the other hand, if the output of the lean burn sensor 325 is not normal in the step (4), the process jumps to the step (8), in which a signal is supplied to the shut-off valve 319 to close it, and then returns to the step (1). In this case, the air does not flow through the bypass passage 318 and the engine runs with the rich mixture.

The operation in the step (7) is detailed with reference to FIG. 18. In the step (9), the ideal output voltage V2 for the lean burn sensor 325 obtained in the step (7) and the actual output voltage V1 obtained in the step (1) are processed to produce a difference (V3=V2−V1) of them and is written it in the RAM 331. In the following step (10), it is determined whether the value V3 is larger than a constant value K1 memorized in the RAM 331. If larger, the process moves to the step (11), in which the value V3 is multiplied by a constant value K2 memorized in the RAM 331, and the product T=V3×K2 is writen in the RAM 331. Then, in the step (12), the stepping motor 320a in the flow valve 320 is controlled to actuate in accordance with said product T. Thus, the product T is a number of the steps for actuating the motor and can be either positive or negative for the actuating in opposite directions. The flow rate of the air in the bypass passage 318 is controlled by the opening degree of the flow valve 320 which corresponds to the rotation angle of the motor 320a, whereby the mixture ratio is controlled. As stated above, the number of the steps, i.e., the product T, for the motor is proportional to the difference V3 between the ideal and actual values V2 and V1. When the difference V3, and thus the product T are large, the opening degree of the valve 320 changes to a large extent to obtain the actual mixture ratio of 2. The constant value K2 is determined to control the ratio as stated above. The control device 326 controls the flow valve 320 to set the mixture ratio at the optimum value in accordance with the load and speed of the engine, as stated above. On the other hand, in the step (10), if the absolute value of V3 is not more than the constant value K1, the motor 320a is not driven and the process returns to the step (1). That is; if the actual mixture ratio 1 is very close to the optimum value 2, it is determined to be in an acceptable range, and thus the opening degree of the valve 320 is not changed to effectively prevent hunting.

Since the mixture ratio is controlled by controlling the flow rate of the air, very precise control can be performed, in comparison with the case that the fuel gas is controlled, as shown at alternate long and short dash line in FIG. 20 illustrating relationship between the number S of the steps and the excess air rate Ar. Therefore, the lean combustion can be effectively performed at the optimum ratio in accordance with the load and speed of the engine, without exceeding the combustion limit, and thus both the improvement of the fuel consumption and the reduction of the nitrogen oxides in the exhaust gas can be achieved. In FIG. 20, the solid line and alternate long and short dash line illustrate the results according to the above embodiment at 1500 rpm and 1800 rpm, respectively. The dash line illustrates a result of the embodiment in FIG. 11 at 1800 rpm. As it is seen therefrom, when the mixture control device of this embodiment is employed, the air excess rate Ar slowly changes in accordance with the change of the opening degree of the valve 320, and thus the precise control can be achieved. It is preferable to provide the shut-off valve 319 in the bypass passage 318, as is employed in the embodiment, to instantaneously make the mixture ratio rich in the acceleration and others.

Another embodiment is described hereinafter.

Figure 21:
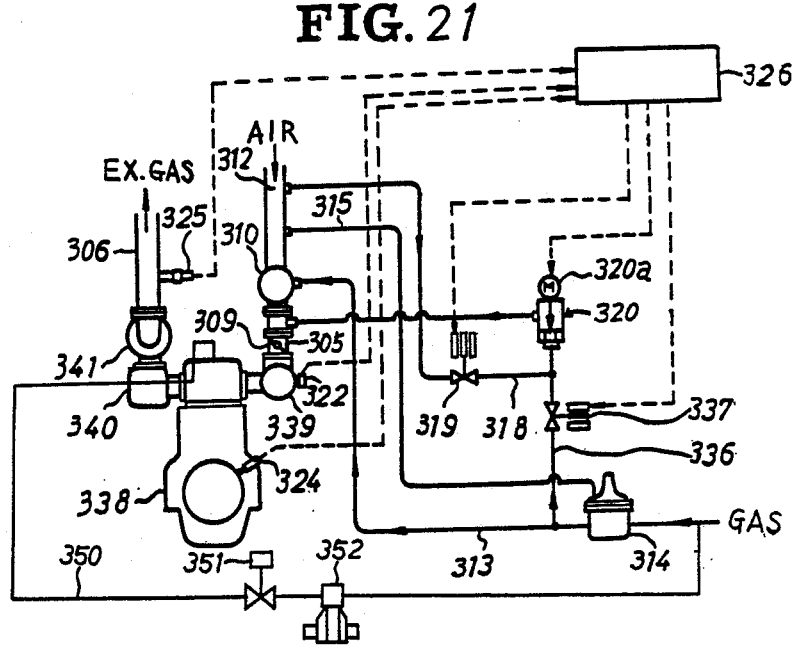
FIG. 21 is a schematic view of another embodiment.

In FIG. 21, elements same as those in FIG. 15 bear same reference numbers, and are nor detailed here. In this embodiment, a gas passage 336 branch from the gas supply passage 313 is connected to a portion of the bypass passage 318 between the valves 319 and 320. The branch passage 336 is provided with a shut-off valve 327 which is electrically controlled by the control device 326. Between the gas supply pipe 313 and the pre-chamber of an engine body 338, there is arranged a pipe 350 which is provided with a shut-off valve 351 and a gas pressure control device 352. 339 is an intake manifold, 340 is an exhaust manifold and 341 is a charger.

Figure 22:
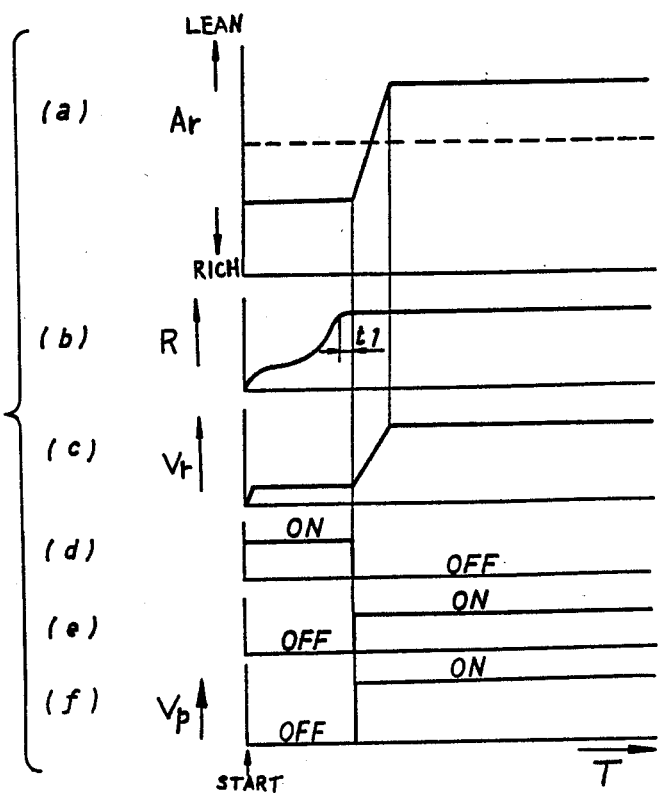
FIG. 22 is a time chart illustrating operations of components in the engine.

An operation of the embodiment is described below with reference to FIG. 22. In FIG. 22, (a) illustrates a mixture ratio AF, (b) illustrates rotation speed R of the engine, (c) illustrates an opening degree Vr of the air flow control valve 320, (d) illustrates opening and closing of the gas shut-off valve 337, (e) illustrates opening and closing of the air shut-off valve 319 (f) illustrates opening and closing operation of the gas shut-off valve. The abscissa is a time T from the start of the engine. In (a), the dash line illustrates the mixture ratio in such a case that the air or the fuel gas does not flow through the bypass passage 318, i.e., the mixture ratio set in the mixer 310. At the start of the engine, the control device 326 opens the air shut-off valve 319 and closes the gas shut-off valve 337, so that a part of the fuel gas in the passage 313 flows through the branch passage 336 and the bypass passage 318 to the intake pipe 305 without flowing through the mixer 310, and thus the mixture ratio becomes rich, resulting in good ignitability as well as good acceleration of the engine. In this operation, the control device 326 controls the valve 320 to achieve the optimum mixture ratio for good ignitability. When a predetermined time t passes after the engine reaches the rated speed, the control device 326 opens the valve 319 and closes the valve 337, as is done in the embodiment in FIG. 15, and simultaneously opens the supply valve 351 to suuply the gas to the pre-chamber so as to perform the optimum control of the air/fuel ratio.

Figure 23:
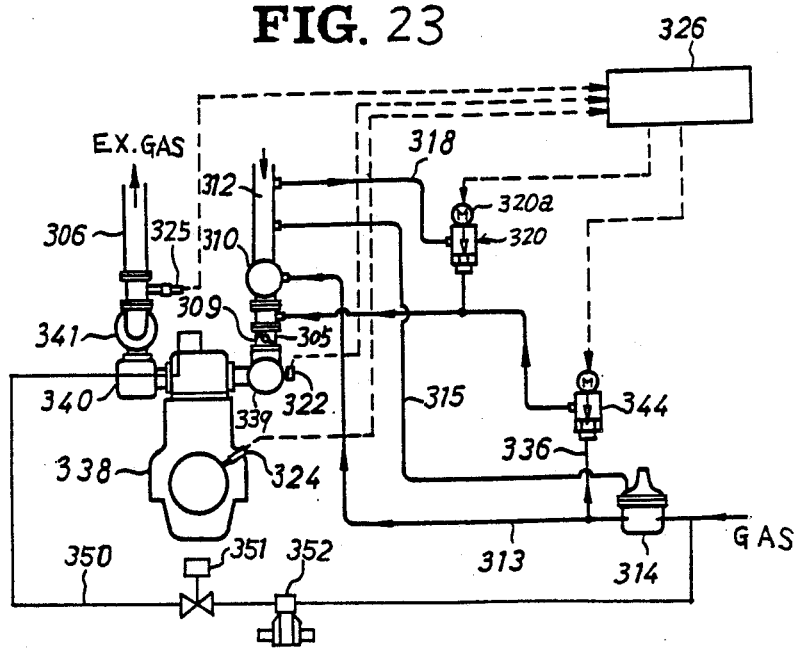
FIG. 23 is a schematic view of a still another embodiment.

Referring to FIG. 23 illustrating another embodiment, a gas passage 336 branched from the gas supply passage 313 is connected to a portion of the bypass passage 318 downstream the valve 320. The branch passage 336 is provided with a flow control valve 344 which is electrically controlled by the control device 326. An air shut-off valve corresponding to the valve 319 in FIG. 21 is not arrange. There is also arranged a pipe 350 which is provided with a shut-off valve 351 and a gas pressure control device 352.

Figure 24:
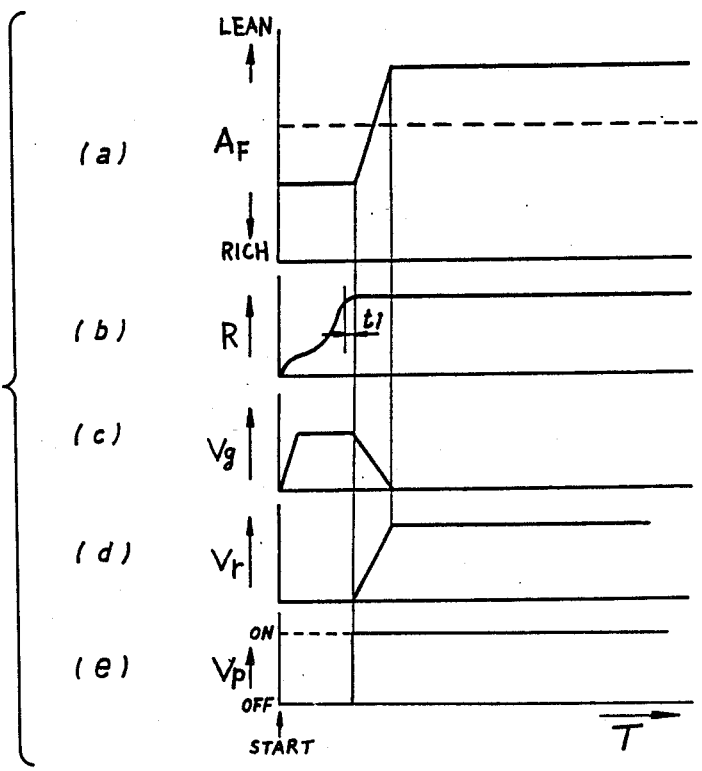
FIG. 24 is a time chart illustrating operations of components in the engine.
Figure 28:
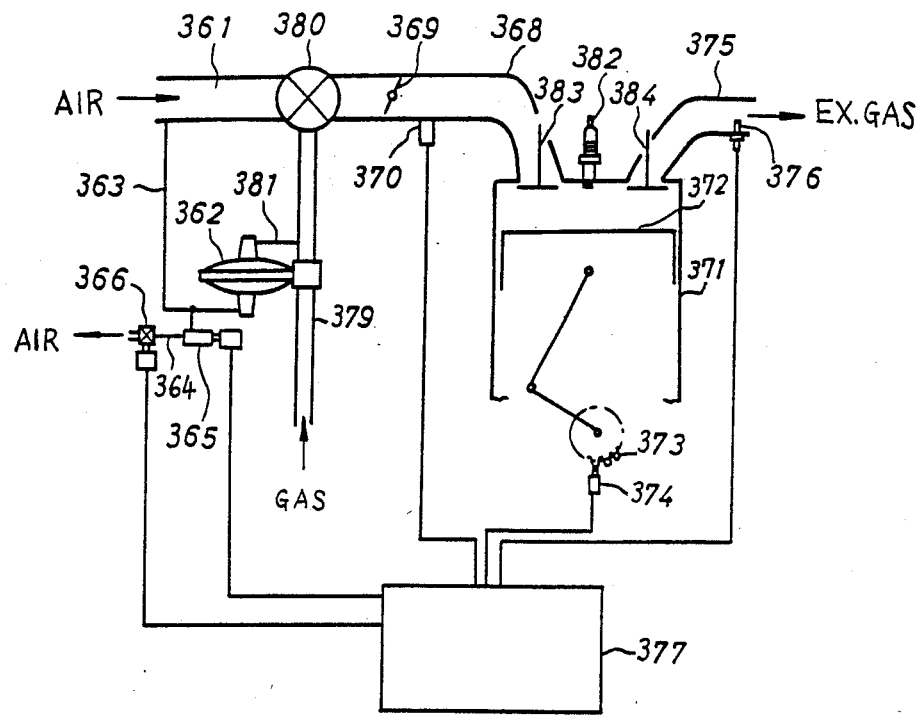
FIG. 28 is a schematic view of other conventional gas engine.

An operation of the embodiment is described below with reference to FIG. 24. In FIG. 24, (a) illustrates a mixture ratio AF, (b) illustrates rotation speed R of the engine, (c) illustrates an opening degree Vr of the gas flow control valve 344, (d) illustrates opening and closing of the air flow control valve 320, (e) illustrates an opening degree Vp of the gas shut-off valve 351. The abscissa is a time T from the start of the engine. In (a), the dash line illustrates the mixture ratio in such a case that the air or the fuel gas does not flow through the bypass passage 318, i.e., the mixture ratio set in the mixer 310. At the start of the engine, the control device 326 completely closes the air flow control valve 320 and controls the opening degree of the gas flow control valve 344, so that a part of the fuel gas in the passage 313 flows through the branch passage 336 and the bypass passage 318 to the intake pipe 305 without flowing through the mixer 310, and thus the mixture ratio becomes rich, resulting in good ignitability as well as good acceleration of the engine. In this operation, the control device 326 controls the valve 344 to achieve the optimum mixture ratio for good ignitability. When a predetermined time t1 passes after the engine reaches the rated speed, the control device 326 completely closes gas flow control valve 344 and controls the opening degree of the air flow control valve 320 to control the mixture ratio, as is done in the embodiment in FIG. 15. Simultaneously it opens the supply valve 351 to supply the gas to the pre-chamber. Whereby, advantages same as or similar to those in the previously described embodiments can be obtained.

As described above, the embodiment in FIGS. 21 and 23 can improve the startability of the engine.

In the above embodiment, although the engine is provided with the charger 341, the invention may be applied to engines without the chargers.

Sensors other than the boost sensor 322 may be employed as the load sensor.

Various motors other than the stepping motors 320a or various electromagnetic devices may be used in the flow control valve 320 for changing the opening degree thereof.

(EFFECT)

According to the invention as recited in claim 13, the optimum combustion and driving of the engine can be achieved as described hereinabove.

I claim:

1. A gas engine of a pre-chamber type in which a pre-chamber is arranged in communication to a main combustion chamber, an intake passage is arranged to supply lean mixture to the main chamber, a gas pipe is provided to form rich mixture by fuel gas in the pre-chamber, and a spark plug adapted to ignite the rich mixture in the pre-chamber prior to the combustion of lean mixture in the main combustion chamber, characterized in that an area of a section of the pre-chamber gradually decreases toward the main combustion chamber.

2. A gas engine of claim 1 wherein d/D is approximately 0.3 and L/D is set in a range between 1.5 and 2.0, in which L is a length of the pre-chamber, D and d are maximum and minimum diameters of the pre-chamber, respectively.

3. A gas engine of claim 1 wherein the pre-chamber has a cylindrical inner surface of a predetermined length at an end portion remote from the main combustion chamber, and a tapered surface continuing to this cylindrical surface.

4. A gas engine of claim 1 wherein an inner surface of the pre-chamber is entirely formed by a tapered surface converging toward the main combustion chamber.

5. A gas engine of claim wherein the main combustion chamber has a diameter of 100 mm or more.

* * * * *